United States Patent [19]

Moeller

[11] Patent Number: 4,687,616

[45] Date of Patent: Aug. 18, 1987

[54] METHOD AND APPARATUS FOR PREVENTING CYCLOTRON BREAKDOWN IN PARTIALLY EVACUATED WAVEGUIDE

[75] Inventor: Charles P. Moeller, Del Mar, Calif.

[73] Assignee: The United States of America as represented by the United States Department of Energy, Washington, D.C.

[21] Appl. No.: 818,946

[22] Filed: Jan. 15, 1986

[51] Int. Cl.[4] .................................... B23K 9/00

[52] U.S. Cl. .................................... 376/123; 376/121; 376/131; 376/132; 376/133; 219/121 P

[58] Field of Search ............... 376/123, 140, 133, 131, 376/132

[56] References Cited

U.S. PATENT DOCUMENTS

| | | | |
|---|---|---|---|
| 3,883,761 | 5/1975 | Hendry | 313/62 |
| 4,263,097 | 4/1981 | Ohkawa | 376/123 |
| 4,292,124 | 9/1981 | Fisch | 376/123 |
| 4,354,998 | 10/1982 | Ohkawa | 376/140 |
| 4,423,001 | 12/1983 | Fisch | 376/123 |
| 4,425,295 | 1/1984 | Fisch | 376/123 |
| 4,511,782 | 4/1985 | Motley | 376/123 |

OTHER PUBLICATIONS

Forrer, et al., "Duplexing & Switching w/Multipactor Discharge"; IRE vol. 50, pp. 442–450, Apr. 1962.

*Primary Examiner*—Donald P. Walsh
*Attorney, Agent, or Firm*—Clifton E. Clouse, Jr.; Roger S. Gaither; Judson R. Hightower

[57] ABSTRACT

Cyclotron breakdown is prevented in a partially evacuated waveguide by providing a section of waveguide having an axial cut therein in order to apply a potential across the two halves of the waveguide. This section is positioned in the waveguide crossing the area of electron cyclotron resonance. The potential applied across the waveguide halves is used to deflect seed electrons into the wall of the waveguide in order to prevent ionization of gas molecules and creation of more electron ion pairs which would result in cyclotron breakdown. Support means is also disclosed for electrically isolating the waveguide halves and transition means is provided between the section of the waveguide with the axial cut and the solid waveguide at either end thereof.

10 Claims, 6 Drawing Figures

METHOD AND APPARATUS FOR PREVENTING CYCLOTRON BREAKDOWN IN PARTIALLY EVACUATED WAVEGUIDE

BACKGROUND OF THE INVENTION

The Government has rights in this invention pursuant to Contract No. DE-ATO3-84-ER51044 between the United States Department of Energy and G. A. Technologies, Inc.

An important application of high-power millimeter-wavelength microwaves is the heating of magnetically confined fusion plasma by means of the electron cyclotron resonance. The heating occurs approximately where the applied frequency $f_o$ equals $f_c \equiv eB/2\pi m$, where e is the elctron charge, B the local magnetic field, and m is the electron mass.

Frequently, it is necessary to launch the microwaves from a region having a higher magnetic field than the region to be heated so that $f_o < f_c$ at the launch point. It is then unavoidable that the feed waveguide pass from the microwave generator, which is outside the magnetic confinement device, through a region having $f_o \cong f_c$ (the resonant region) in order to reach the region having $f_o < f_c$. If the waveguide is partially evacuated (by being connected to the partially evacuated vessel which contains the plasma), breakdown will occur in the waveguide in the region having $f_o = f_c$. The only means of preventing this has been to have the waveguide pressurized in the region having $f_o = f_c$, which requires that a window or vacuum break be placed in the waveguide between the launching horn and the resonant region. This means that a dielectric window must be placed in the interior of the vacuum vessel where it is highly inaccessible, difficult to cool, and, in the case of a fusion reactor, exposed to intense ionizing radiation.

OBJECTS AND SUMMARY OF THE INVENTION

It is an object of this invention to provide a method and apparatus for preventing cyclotron breakdown in a partially evacuated waveguide used to insert microwave energy for electron cyclotron heating in a plasma magnetic confinement device.

A further object of the invention is to apply an electrostatic field along a section of such a waveguide in order to run seed electrons into the wall of the waveguide.

A still further object of the invention is to provide an axial cut in a portion of the waveguide in the plane of the rf electric field in order to provide means for applying the static electric field.

Another object of the invention is to provide insulating support means for the two sections of said waveguide formed by said axial cut.

Still another object of the invention is to provide transition means between the ends of said portions of said waveguide containing the cut and the remainder of the waveguide.

In accordance with the invention, cyclotron breakdown in a partially evacuated waveguide used to insert microwave energy for electron cyclotron heating in a plasma magnetic confinement device is prevented by applying an electrostatic field in a section of the waveguide crossing the resonance region of the device in order to remove electrons, and thereby prevent ionization of gas molecules and creation of more electron ion pairs in said waveguide. The means for accomplishing this comprises an axial cut in that section of the waveguide. The cut is made in the plane of the microwave rf electric field. A static electric field is applied to the two sides of the section by a suitable bias voltage source.

The novel features that are considered characteristic of this invention are set forth with particularity in the appended claims. The invention will best be understood from the following description when read in connection with the accompanying drawings.

Figure 3:
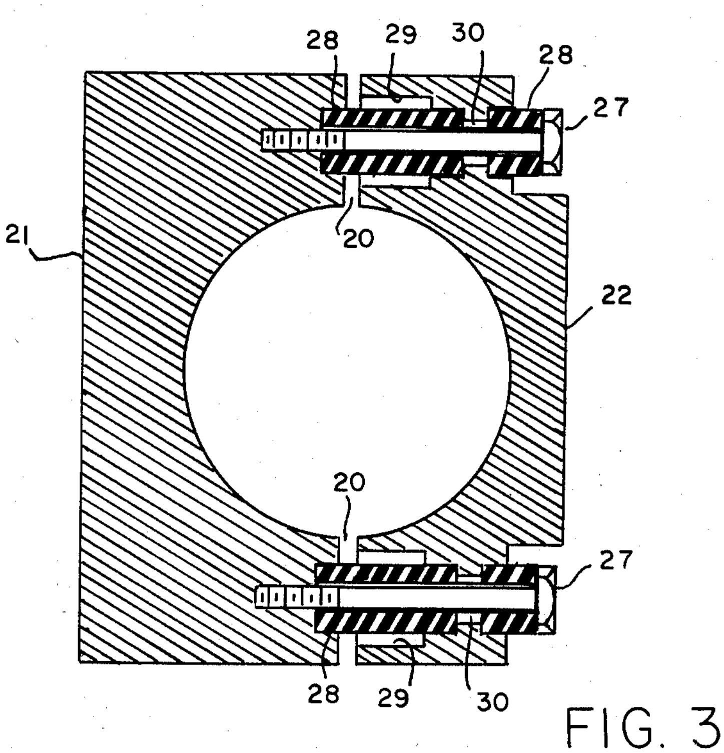
FIG. 3 illustrates a cross section of a practical realization of the waveguide section having an axial cut, such as shown schematically in FIG. 2 taken at A—A in FIG. 1 at a point illustrating support means for supporting the two waveguide sections while providing insulation therebetween.

FIG. **4*a* is a longitudinal sectional view of a transition from the split waveguide shown in FIG. 3** to the normal waveguide made without loss of dc isolation.

Figure 4A:
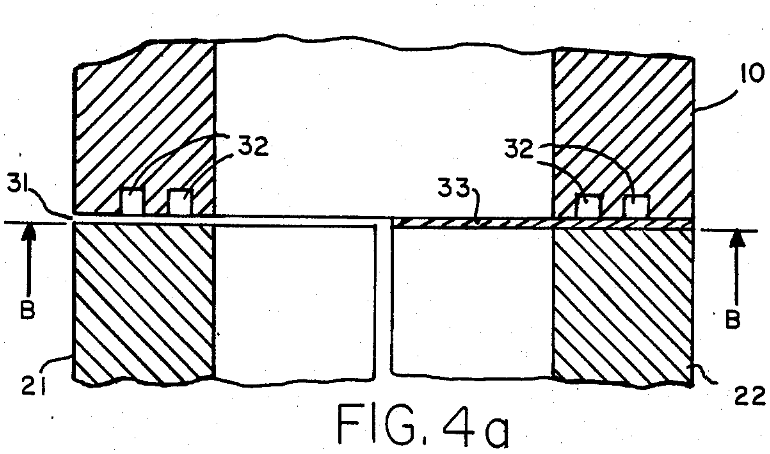

FIG. **4*b* is a view along line B—B in FIG. 4*a* and shows the choke face of FIG. 4*a*** with shim in place.

Figure 5:
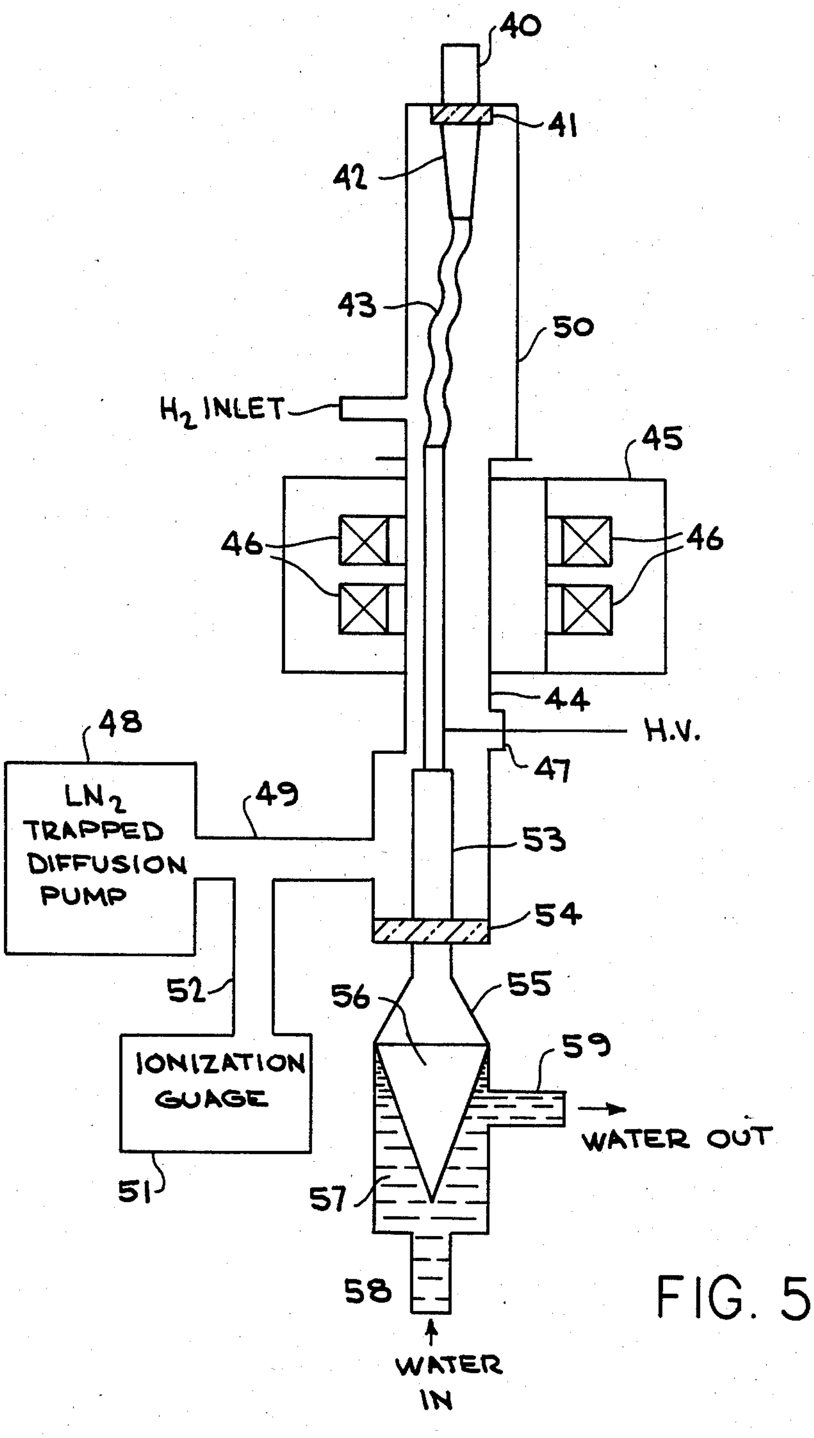

FIG. 5 illustrates a test set up in schematic form for testing the subject invention.

DETAILED DESCRIPTION OF THE INVENTION

In order to launch microwaves for Electron Cyclotron Heating (ECH) from the high field side of a plasma confinement device, such as a tokamak (nuclear reactor), using the fundamental resonance, it is unavoidable that the beam of microwaves, whether in a waveguide or not, cross the resonance region prior to reaching the high field region from which launching can take place.

Figure 1:
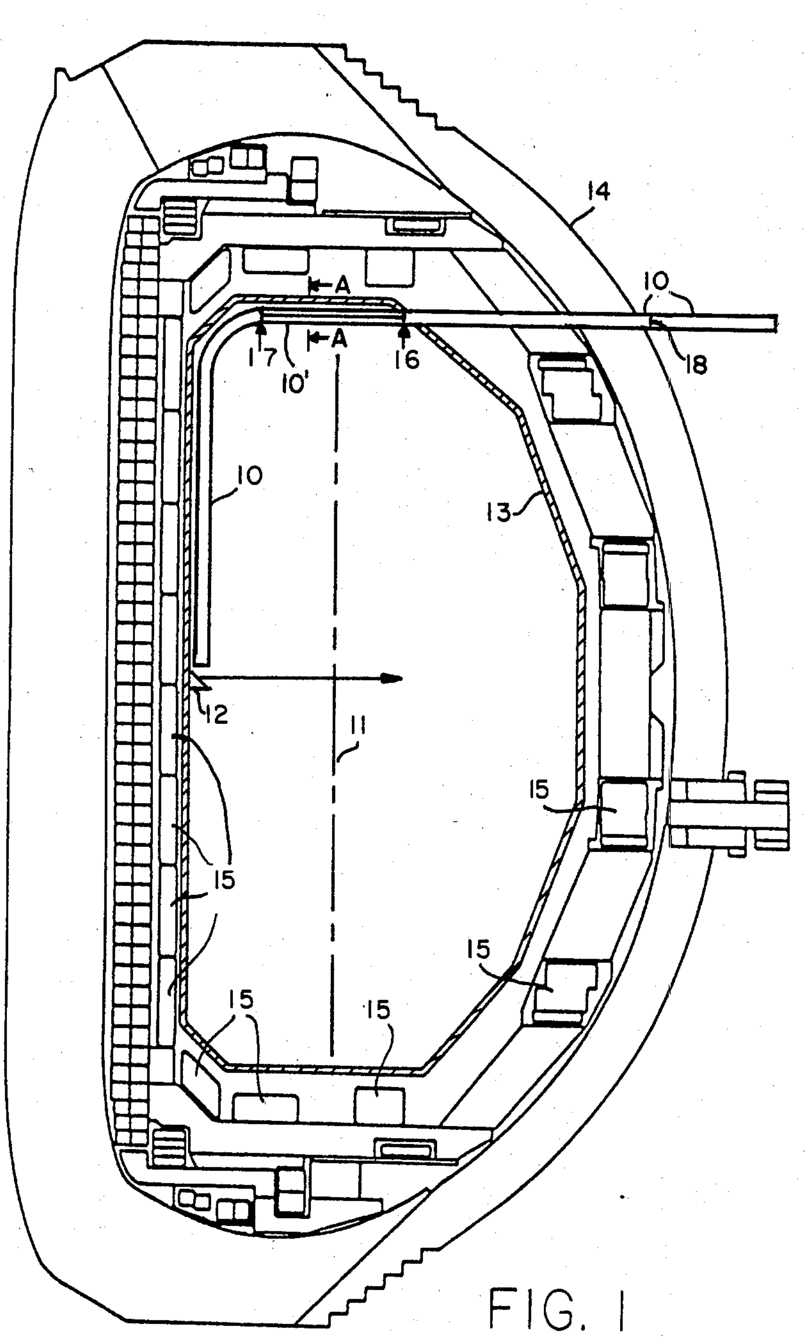
FIG. 1 illustrates a cross section of a vacuum vessel, such as a tokamak, at a point where a waveguide is inserted for introducing microwave energy therein.

Referring to a schematic diagram of a plasma magnetic confinement device shown in cross section in FIG. 1, a waveguide 10 crosses the region 11 of cyclotron resonance prior to impinging on a launch device 12 and being directed as shown by an arrow back across the region 11. The plasma is contained in a vacuum vessel 13 which is surrounded by torroidal field coils 14 which, together with poloidal field coils 15, create a plasma confining field.

The cyclotron resonance region 11 extends the entire height of the torroidal coils 14 and so is unavoidable when energy is inserted through the waveguide 10. The device shown in FIG. 1 may be, for example a torroidal plasma fusion reactor, one form of which is shown in U.S. Pat. No. 4,292,124, Fisch, where the plasma is confined by toroidal and poloidal fields as explained therein.

A split waveguide section 10' of waveguide 10 extends from a point 16 just inside vacuum vessel 13 to a point 17 well across the cyclotron resonance region 11. A vacuum window is provided in the waveguide 10 at point 18 outside the poloidal coil 14 where it is readily accessible, avoiding the problem of placing it in the vacuum vessel.

Figure 2:
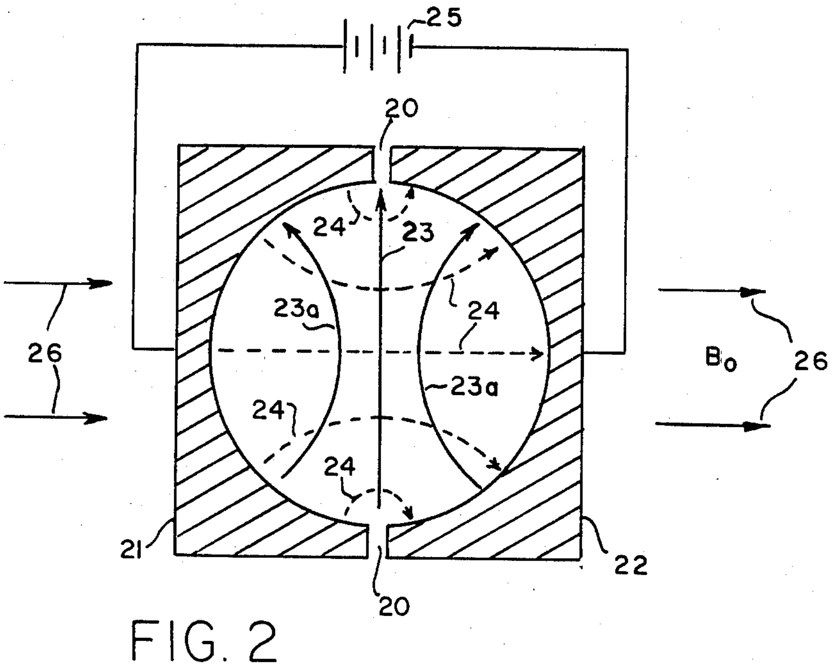
FIG. 2 illustrates schematically a cross section of a conceptual arrangement for sweeping out seed electrons of the waveguide shown in FIG. 1 taken at A—A.

Assuming it is desired to launch the extraordinary mode from the high field region, the E field would be polarized vertically at cross section A—A of FIG. 1 as shown at 23 in FIG. 2 for the $TE_{11}$ (or $HE_{11}$) mode, as might be used. In a tokamak, the total static magnetic field is not truly toroidal, so that at the waveguide 10, the static magnetic field $B_o$ would have a radial component as well, with as much as 1/10 the strength of the toroidal component.

Thus, the microwave E field is mainly perpendicular to the static $B_o$ field, thereby producing the strongest possible cyclotron interaction. At the residual gas pressures normally encountered in plasma confinement devices, a breakdown will inevitably occur at high power in the cyclotron resonant region 11.

In order to understand the proposed solution to this problem, it is necessary to examine the origin of the cyclotron breakdown. We are concerned with pressures $\leqq 10^{-4}$ torr. For example, for hydrogen, the cross section $\sigma$ for an ionizing collision between an electron and a hydrogen molecule is zero below an electron energy of 13.6 eV, rising to a maximum of approximately $1\times10^{-16}$ cm$^2$ at 100 eV, then falling slowly to $2.5\times10^{-17}$ cm$^2$ at 1 kV, with at least a linear decrease with energy beyond 1 kV. The collision frequency is defined by $\nu = v\sigma n$ where v is the electron speed and n the gas density. $\nu$ has a value of $5.3\times10^{5}$ sec$^{-1}$ at 1 kV and $10^{-4}$ torr, falling linearly with v above 1 kV.

For the high powers of interest here, the typical electric field in the waveguide would be 10 kV/cm. A typical frequency would be 100 GHz. Well away from the cyclotron resonance, an electron acquires a peak oscillatory energy of only 0.22 eV in such a field. Waveguide breakdown is not even possible at low pressure at such a high frequency unless local waveguide heating causes sufficient outgassing to raise the pressure so that the elastic collision frequency approaches the applied frequency. At the cyclotron resonance, conversely, the electron's velocity increases as $v = eE_ot/(2\ m)$, where $E_o$ is the peak rf field and t is the elapsed time, so that ignoring relativistic effects, an electron acquires 22 keV energy in $10^{-9}$ sec in a 10 kV/cm field. It is therefore essentially impossible to prevent an electron at resonance from acquiring sufficient energy to ionize the residual gas.

The mean time between ionizing collisions, conversely, is well in excess of $10^{-6}$ sec, which is long compared to electron transit times (a 1 eV electron travels along a magnetic field line about 60 cm in $10^{-6}$ sec). If an electron could be swept out of the resonant region by a static electric field and into the waveguide wall before an ionizing collision could take place, multiplication would not occur. The physical realization of this idea depends on the particular mode being propagated in the feed waveguide. If power is to be radiated from a circular waveguide, the $TE_{11}$ (in smooth waveguide) or the $HE_{11}$ mode (in corrugated waveguide) is used.

FIG. 2 shows in a cross section taken along a line A—A of FIG. 1 a conceptual arrangement for sweeping out seed electrons, and FIG. 3 shows in a cross section, also taken along line A—A of FIG. 1, a practical realization of the concept. A longitudinal cut 20 in the waveguide section 10′ is illustrated in each of these figures, forming two waveguide halves 21 and 22. The $TE_{11}$ or $HE_{11}$ polarization is oriented so that there is no transverse current at the longitudinal cut 20 which coincides with the region 23 of maximum radial electric field as indicated by a vertical arrow 23 in FIG. 2. A static electric field indicated by dashed lines 24 is created by a voltage source 25 connected to the waveguide halves 21 and 22, as shown. As will be noted with reference to FIG. 3 and FIG. 4*a*, the half 21 is electrically grounded and mechanically connected to the waveguide 10 at both ends, and the half 22 is insulated from but mechanically connected to the grounded half for support. The static magnetic field $B_o$ is indicated by arrows 26. The rf electric field is indicated by the arrow 23 and arrows 23*a*.

Support means for the second half 22 of the waveguide section 10′ to the first half 21 is provided, as shown in FIG. 3, comprised of bolts 27 which join the waveguide halves 21 and 22. These bolts are electrically insulated by ceramic insulators 28 so that the second half 22 is electrically insulated from the first half 21, but mechanically supported by the first half 21. An extended creep path 29 is provided in a bore 30 through which bolts 27 pass.

A transition from the split waveguide section 10′ to the normal waveguide 10 can be made without loss of dc isolation using a $TE_{11}$ mode choke. At millimeter wavelengths, the most practical choke design consists of alternating quarter wavelength radial waveguides. Referring to FIG. 4*a*, if $d_1$ is the width of gap 31 and $d_2$ is the groove depth of choke grooves 32 plus the gap width, the impedance across the gap at the waveguide wall is $$Z = \left(\frac{d_1}{d_2}\right)^{2n} Z_o,$$

where $Z_o$ is the impedance at the edge of the outermost groove, and n is the number of grooves. Since $Z_o$ is no larger than the free space impedance, Z can be made arbitrarily small. $d_1/d_2$ can easily be made $<\frac{1}{4}$. Metal shim 33 is between the grounded one half 21 of the split waveguide 10′ and the solid waveguide section 10, and insulating gap 31 is between the insulated one half 22 of the split waveguide 10′ and the solid waveguide section 10.

Figure 4B:
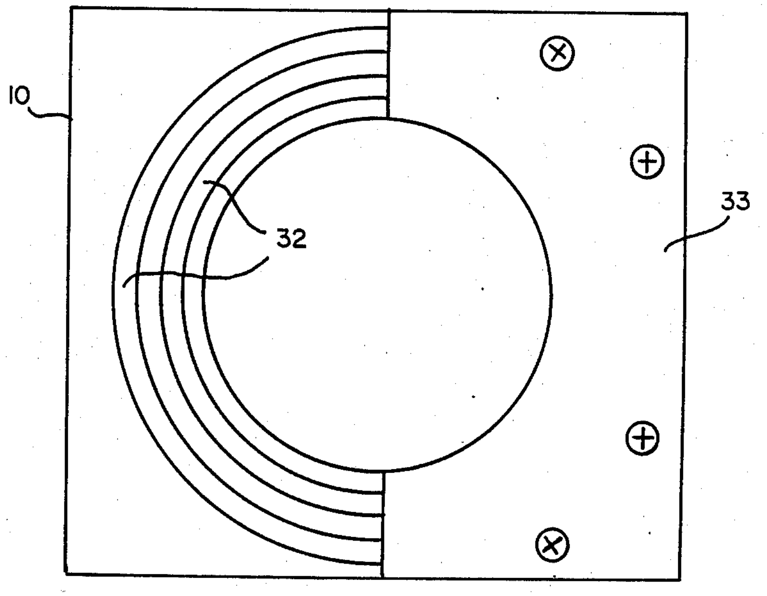

FIG. 4*b* illustrates (in a view taken along a line B—B in FIG. 4*a*) the appearance of the choke face with shim 33 in place on the solid waveguide 10 with the portion of grooves 32 adjacent to the insulated half 21 of the split waveguide 10′ shown exposed. Since this half 22 is electrically connected to the solid waveguide 10 which is grounded, this half 22 is also grounded, as noted hereinbefore. Consequently, this half 22 may be mechanically connected to the solid waveguide 10 for support (by means not shown) while the insulated half 21 of the split waveguide 10′ is supported by and insulated from the second half 22.

A test setup as shown in FIG. 5 includes an optical fiber 40 looking through a quartz window 41 into a waveguide 42 which is tapered from 1.5″ diameter to 0.75″ diameter at a remote end connected to a periodic curvature $TE_{01}$ to $TE_{11}$ converter 43 which is in turn connected to a section of split waveguide 44 supported generally as described with reference to FIGS. 3 and 4*a*. A magnet (normally used with a gyrotron) including a cryostat 45 containing super conducting solenoids 46 surrounds the split waveguide 44 for providing the proper magnetic field. A high voltage vacuum feedthrough 47 is connected to provide the potential across the halves of split waveguide 44. An $LN_2$ trapped diffusion pump 48 is connected through exhaust port 49 to a vacuum can 50 to exhaust it, and an ionization gauge 51 is connected through port 52 to measure the pressure inside the vacuum can 50.

The split waveguide 44 radiates into the 1.5 inch diameter waveguide 53 and transmits through a quartz window 54. A taper is then made from 1.5 inches to 2.5 inch diameter at a section 55 to a ceramic cone 56 in a water load 57 where water goes in port 58 and comes out port 59.

This section of 0.75 inch diameter split waveguide was made for a test at 60 GHz. The split waveguide section was immersed in an axial magnetic field (the bore of a gyrotron magnet), so that the static electric field E was substantially perpendicular to the magnetic field B. This is a much more severe test than the intended application, where the torroidal magnetic field would be essentially parallel to the static electric field in the split waveguide. Even with E perpendicular to B, electrons can still be swept into the wall by means of the $E \times B$ drift, but the effect is much weaker than if E is parallel to B.

In the test, 5 msec pulses of up to 200 kW from a 60 GHz gyrotron were passed through the split waveguide section, with ~90% of the power in the $TE_{11}$ mode, which in turn radiated into the 1.5 inch diameter pipe connected to the window and water load. When a resonance existed in the split waveguide without bias, a breakdown would inevitably occur in less than 5 msec (typically <1 msec), even at the lowest pressure obtainable, $\sim 7 \times 10^{-5}$ torr. Breakdown was detected by means of a fiber optic light sensor that looked through the input quartz microwave window. The presence of light was correlated with the absence of power into the water load. Forward and reflected power were monitored at the gyrotron, but the breakdown did not necessarily produce a significant increase of the reflected power signal level. At low pressure ($7 \times 10^{-5}$ torr) the only effect was a slight noisiness on the reflected signal; only at higher pressure ($10^{-4}$ torr) did the reflected power signal rise noticeably.

With the high voltage dc bias applied to the split waveguide, it was possible to prevent the breakdown. The minimum bias voltage was found to be 2.3 kV at $1 \times 10^{-3}$ torr and 1.0 kV at $6 \times 10^{-4}$ torr.

In view of the test system geometry, the $E \times B$ drift is a likely mechanism for sweeping electrons out of the resonance region. For a 1 kV bias, in the region of lowest electrostatic field, $E=5 \times 10^4$ $V/m$, giving a drift velocity $v_d = E \times B/B^2 = 2.5 \times 10^6$ cm/sec. Extrapolating from the data in Brown (Sanborn C. Brown, "Basic Data of Plasma Physics 1966," MIT Press, 1966, p. 141), the collision time at $6 \times 10^{-4}$ torr would be $\approx 1 \times 10^{-5}$ sec at 100 kV and $1.6 \times 10^{-6}$ sec at 10 kV, while the maximum time of travel to the wall is $0.8 \times 10^{-6}$ sec. Therefore, even the $E \times B$ drift is fast enough to remove electrons before they can make an ionizing collision. The $1 \times 10^{-4}$ torr case fits equally well, since both the pressure and voltage are about doubled.

In the tokamak geometry, far lower voltages should be adequate, since the electrostatic field is essentially parallel to the torroidal magnetic field in that case.

Since the principles of the invention have now been made clear, modifications which are particularly adapted for a specific situations without departing from those principles will be apparent to those skilled in the art. Consequently, the appended claims are intended to cover such modifications, as well as the subject matter described, and to be limited only by the true spirit of the invention.

What is claimed is:

1. A method of preventing cyclotron breakdown in a partially evacuated waveguide used to insert microwave energy for electron cyclotron heating in a plasma magnetic confinement device comprising the steps of, applying a static magnetic field for confining the plasma in said device and applying an electrostatic field in order to remove electrons to prevent ionization of gas molecules and creation of more electron ion pairs in said waveguide.

2. The method of claim 1 wherein said electrostatic field has a substantial component along said static magnetic field.

3. The method of claim 2 wherein said electrostatic field is applied along said static magnetic field in order to run said seed electrons into the wall of said waveguide.

4. The method of claim 3 wherein said seed electrons are run into said wall in a time short compared to the time for ionization of the gas molecules in said waveguide by accelerated electrons.

5. In a magnetic plasma confining device including a torroidally shaped vacuum vessel having field coils wound around said vessel in order to generate a static magnetic field for plasma confinement, a waveguide running from the low magnetic field side of said vacuum vessel across a portion wherein cyclotron resonance occurs to the high field side of said vacuum vessel, a launch means positioned at the end of said waveguide to reflect microwave energy back across said vessel into said plasma, and means for applying microwave energy through said waveguide against said launch means, the improvement comprising means for applying a static electric field across a portion of said waveguide in the area crossing said cyclotron resonance whereby seed electrons are removed in order to prevent ionization of gas molecules and creation of more electron ion pairs.

6. The device of claim 5 wherein said static electric field has a substantial component along said static magnetic field.

7. The device of claim 6 wherein said means for applying a static electric field includes an axial cut in said portion of said waveguide in the plane of the microwave rf electric field.

8. The device of claim 7 wherein said means for applying a static electric field includes insulating support means for joining the two sides of said portion of said waveguide defined by said axial cut.

9. The device of claim 8 wherein transition means is provided between the ends of said portion of said waveguide and the remainder of said waveguide.

10. The device of claim 9 wherein said transition means includes an insulating gap defined by a metal shim and has alternating quarter wavelength radial waveguides cut in the faces of the solid waveguide sections.

* * * * *